(12) United States Patent
Harada et al.

(10) Patent No.: US 9,153,273 B2
(45) Date of Patent: Oct. 6, 2015

(54) LENS DRIVING DEVICE AND OPTICAL PICKUP

(71) Applicant: Funai Electric Co., Ltd., Osaka (JP)

(72) Inventors: Kazuya Harada, Osaka (JP); Taishi Morita, Osaka (JP); Yuji Ishihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/046,011

(22) Filed: Oct. 4, 2013

(65) Prior Publication Data

US 2014/0126341 A1   May 8, 2014

(30) Foreign Application Priority Data

Nov. 7, 2012  (JP) .................... 2012-245116

(51) Int. Cl.
*G11B 7/095* (2006.01)
*G11B 7/00* (2006.01)
*G11B 7/1376* (2012.01)
*G02B 7/08* (2006.01)
*G11B 7/1392* (2012.01)

(52) U.S. Cl.
CPC ............... *G11B 7/1376* (2013.01); *G02B 7/08* (2013.01); *G11B 7/13925* (2013.01)

(58) Field of Classification Search
CPC ........... G11B 7/1372; G11B 11/10543; G11B 7/082; G11B 7/09; G11B 7/0925; G11B 7/0927; G11B 7/093; G11B 7/094; G11B 7/0948; G11B 7/095; G11B 7/1374
See application file for complete search history.

(56) References Cited

U.S. PATENT DOCUMENTS

| | | | |
|---|---|---|---|
| 5,805,543 A * | 9/1998 | Takamine et al. | 369/44.32 |
| 5,966,354 A * | 10/1999 | Takahashi et al. | 369/44.27 |
| 6,480,460 B1 * | 11/2002 | Ohkuma et al. | 369/246 |
| 7,573,787 B2 | 8/2009 | Park | |
| 7,924,689 B2 * | 4/2011 | Fukuhara | 369/116 |
| 2002/0141300 A1 * | 10/2002 | Hirashima | 369/44.29 |
| 2003/0063530 A1 * | 4/2003 | Takehara et al. | 369/44.23 |
| 2004/0042355 A1 * | 3/2004 | Yamamoto et al. | 369/44.32 |
| 2004/0095860 A1 * | 5/2004 | Ariyoshi et al. | 369/44.32 |
| 2007/0064551 A1 * | 3/2007 | Mizuno et al. | 369/44.23 |
| 2008/0089194 A1 * | 4/2008 | Matsuzaki et al. | 369/44.32 |
| 2010/0232265 A1 * | 9/2010 | Nakata et al. | 369/44.15 |

* cited by examiner

*Primary Examiner* — Dionne Pendleton
(74) *Attorney, Agent, or Firm* — Osha Liang LLP (57) ABSTRACT

A lens driving device includes a lens holder that holds a lens, a driving portion that drives the lens holder through a magnetic force produced using a coil and a magnet, and a guide shaft that supports the lens holder movably. When moving the lens holder to a target position, an AC voltage is applied to the coil over a specific interval from a beginning of movement of the lens holder. Further, an amplitude of the AC voltage is reduced stepwise with the passage of time.

18 Claims, 7 Drawing Sheets

LENS DRIVING DEVICE AND OPTICAL PICKUP

FIELD OF TECHNOLOGY

The present invention relates to a lens driving device and an optical pickup, and a method for driving lenses.

BACKGROUND ART

Conventionally, lens driving devices for driving lenses have been provided in optical devices. For example, optical pickups may be provided with lens driving devices for driving a movable lens, such as a collimating lens, along the direction of the optical axis for the purpose of suppressing the effect of spherical aberration. Such a lens driving device is structured through the provision of, for example, a lens holder for holding the lens, a driving portion for applying a driving force to the lens holder, and a guide shaft for guiding the lens holder so as to move in the target direction. The driving portion may use a motor of a rotating type, such as a stepping motor, or may use a linear motor mechanism.

Patent Citation 1, for example, discloses a lens driving device that uses a linear motor mechanism. This Patent Citation 1 discloses the superimposition of an AC voltage on a DC voltage and the application of the voltage to a coil, when driving a lens holder, for the purpose of reducing the frictional force between the lens holder (a movable portion) and the guide shaft.

PRIOR ART CITATIONS

Patent Citation

[Patent Citation 1] U.S. Pat. No. 7,573,787

However, in the structure disclosed in Patent Citation 1, the amplitude of the AC component that is superimposed on the DC voltage when driving the lens holder is fixed at a constant value. In the investigations by the present inventors it was discovered that, in some cases, setting the amplitude of the AC component that is superimposed on the DC voltage so as to be small causes the lens holder to not move, due to the effects of the static frictional force. On the other hand, it was learned that when the amplitude of the AC component that is superimposed on the DC voltage is set so as to be large, in some cases the position of the lens holder will slip from the target position. That is, in the structure disclosed in Patent Citation 1, in some cases it is not possible to position the position of the lens holder, which is moved by the lens driving mechanism, accurately at a target position.

SUMMARY OF THE INVENTION

One or more embodiments of the present invention provide a lens driving device wherein it is possible to position the lens accurately at a target position. Moreover, one or more embodiments of the present invention provide an optical pickup that performs correction of spherical aberration through the provision of such a lens driving device.

In one aspect, a lens driving device according to one or more embodiments may comprise a lens holder that holds a lens; a driving portion that drives the lens holder through a magnetic force produced using a coil and a magnet; and a guide shaft that supports the lens holder movably, wherein: when moving the lens holder to a target position, an AC voltage is applied to the coil over a specific interval from a beginning of movement of the lens holder, and an amplitude of the AC voltage is reduced stepwise over passage of time.

According to one or more embodiments, an AC voltage with a large amplitude may be applied to the coil at the beginning of movement of the lens holder (the lens), and an AC voltage with a small amplitude may be applied to the coil at the point in time wherein the lens holder approaches the target position. Because of this, the structure according to one or more embodiments may reduce the effect of the static frictional force (the force that acts between the lens holder and the guide shaft) at the beginning of movement of the lens holder, thus enabling the lens holder to move smoothly. Because, in one or more embodiments, the amplitude of the AC voltage is reduced as the lens holder approaches the target position, the lens holder can approach the target position gradually.

In one or more embodiments, the AC voltage may be superimposed on a DC voltage that is applied to the coil to move the lens holder. One or more embodiments of this structure may enable the lens holder to approach the target position and to stop (position) the lens holder at the target position accurately.

In one or more embodiments, the DC voltage may be maintained at a constant value from the beginning of movement of the lens holder, where the constant value is the same as the voltage value that is required to move the lens holder to the target position. One or more embodiments of this structure may enable control of the voltage that is applied to the coil to be simple, facilitating the achievement of a structure wherein the lens holder can be positioned at the target position accurately.

In one or more embodiments, the value of the DC voltage may be changed in a stepwise manner, where, at the point in time that a specific interval has elapsed, the DC voltage has reached the voltage value required for moving the lens holder to the target position. One or more embodiments of this structure may enable the lens holder to approach the target position and to position the lens holder at the target position accurately.

A lens driving device according to one or more embodiments may further comprise a biasing member for biasing the lens holder, where the stopping position of the lens holder is determined based on the relationship between the electromagnetic force and the biasing force of the biasing member. One or more embodiments of this structure may enable the accuracy of the stopping position of the lens holder to be increased easily.

An optical pickup according to one or more embodiments of the present invention may comprise a lens driving device of any of the structures set forth above. One or more embodiments of this structure may increase the accuracy of the stopping position of the lens that is driven by the lens driving device, thus enabling the correction of spherical aberration to be performed correctly.

In the optical pickup according to one or more embodiments, the structure may be one comprising a light source and an object lens for focusing the light emitted from the light source onto an information recording layer of an optical disk, wherein the lens of the lens driving device is a collimating lens that is disposed on a light path between the light source and the object lens. One or more embodiments of this structure may enable a structure that is able to suppress spherical aberration appropriately to be achieved easily.

One or more embodiments of the present invention may enable the provision of a lens driving device able to position a lens to a target position accurately. Moreover, one or more embodiments of the present invention enable the provision of an optical pickup for performing correction of spherical aberration appropriately through the provision of such a lens driving device.

DETAILED DESCRIPTION OF THE INVENTION

Embodiments of the lens driving device and the optical pickup according to the present invention will be explained below referencing the drawings.

Figure 1:
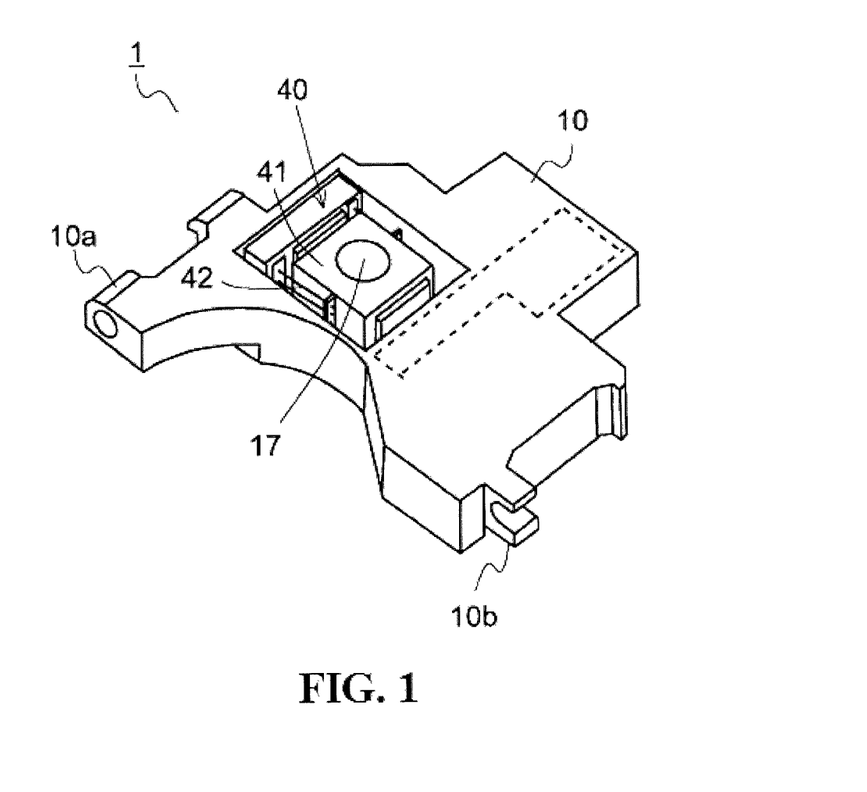
FIG. 1 is a schematic perspective diagram illustrating the external structure of an optical pickup according to one or more embodiments of the present invention.

FIG. 1 is a schematic perspective diagram illustrating an external view structure of an optical pickup 1 according to one or more embodiments of the present invention. The optical pickup 1 may be provided with a pickup base 10. Various types of components that structure the optical pickup 1 may be mounted on the pickup base 10. Certain components or "portions" of the present invention may take the form of a circuit, processor, etc. Bearing portions 10a and 10b may be provided at the left and right end portions of the pickup base 10. The pickup base 10 may be supported slidably, on a guide shaft (not shown), using the bearing portions 10a and 10b. The guide shaft referred to here may be provided in an optical disc device (a device for reading from/writing to an optical disc). The optical pickup 1 accesses a desired address of a rotating optical disc while moving along the guide shaft. The optical pickup 1 that has accessed the desired address reads information from the optical disc or writes information to the optical disc.

Figure 2:
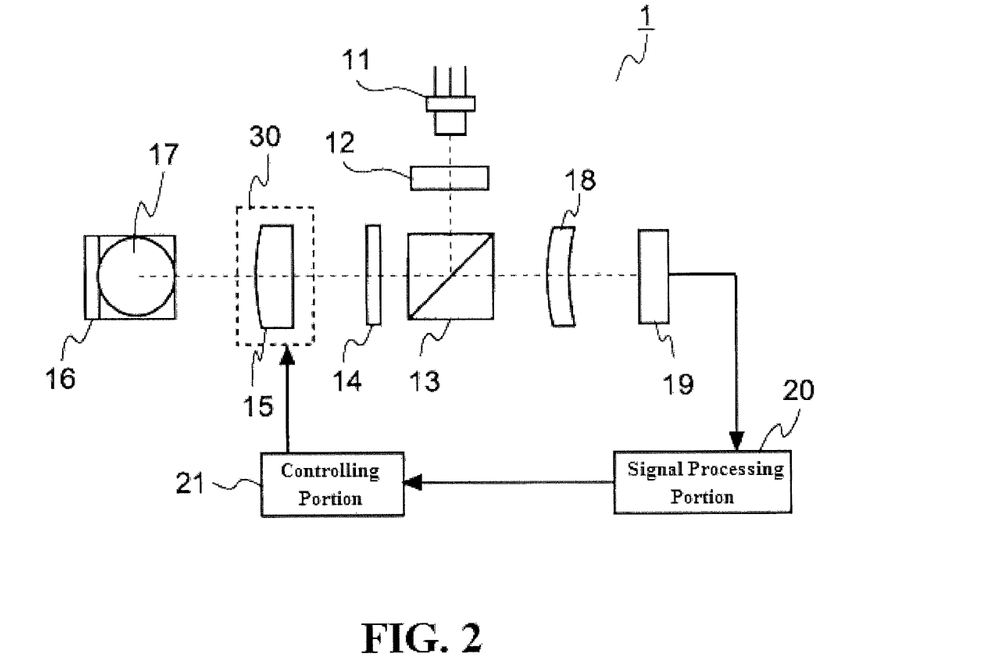
FIG. 2 is a schematic diagram illustrating the optical structure of an optical pickup according to one or more embodiments of the present invention.

FIG. 2 is a schematic diagram illustrating an optical mechanism for an optical pickup 1 according to one or more embodiments of the present invention. As illustrated in FIG. 2, the optical pickup 1 may be provided with a semiconductor laser 11 (one example of a light source). The type of semiconductor laser 11 is determined as appropriate depending on the type of optical disc to which the optical pickup 1 will be applied. For example, if the optical pickup 1 is to be applied to a Blu-ray disc (BD), then a semiconductor laser that emits a laser 11 beam in the 405 nm wavelength band is selected.

If the optical pickup 1 is to be applied to multiple types of optical discs (for example, three types: BD, DVD, and CD), rather than just one type of optical disk, the number of semiconductor lasers may be plural. In this case, the optical mechanism may be modified as appropriate from the structure in the present embodiment, and, for example, the number of object lenses for focusing the beam from the light source onto the information recording layer of the optical disc may be plural.

A diffraction element 12 provided in the optical pickup 1 divides the laser beam emitted from the semiconductor laser 11 into a primary beam and two secondary beams (dividing into a total of three beams). The diffraction element 12 may be provided for the purpose of producing a tracking error (TE) signal through the DPP (Differential Push-Pull) method. However, the TE signal may be produced through other than the DPP method, and the diffraction element 12 may be omitted as appropriate.

A polarized beam splitter 13 provided in the optical pickup 1 reflects the beam from the semiconductor laser 11 and passes the return beam from the optical disc (not shown, disposed in front of the plane of the paper in FIG. 2). The polarized beam splitter 13 improves the efficiency of light utilization in conjunction with a quarter wave plate 14, described below. In some cases, a beam splitter able to split polarized beam components, a half mirror, or the like, may be provided instead of the polarized beam splitter 13.

The quarter wave plate 14 provided in the optical pickup 1 converts the linearly polarized beam emitted from the semiconductor laser 11 into circularly polarized beam. The quarter wave plate 14 also converts the return beam from the optical disc (a circularly polarized beam) into a linearly polarized beam. The direction of polarization of the linearly polarized beam is a direction that wherein the direction of polarization of the linearly polarized beam that was emitted from the semiconductor laser 11 is rotated 90°.

The collimating lens 15 provided in the optical pickup 1 can be moved in the direction of the optical axis (the left-right direction in FIG. 2) by a lens driving device 30, described in detail below. The position of the collimating lens 15 in the optical axis direction determines whether the beam emitted from the collimating lens 15 (the beam that is directed toward the optical disc) is a collimated beam, a converging beam, or a diverging beam. The lens driving device 30, as with the other optical members, and the like, may be mounted on the pickup based 10, and may be disposed in the region surrounded by the dotted line FIG. 1.

A standing mirror 16 provided in the optical pickup 1 reflects the beam from the collimating lens 15 to alter the direction of travel of the beam. In FIG. 2, the beam reflected by the standing mirror 16 progresses in a direction out the front side of the paper.

The object lens 17 provided in the optical pickup 1 may be disposed separated from the standing mirror 16 (on the side that is in front of the standing mirror 16 in FIG. 2), and may focus the beam from the standing mirror 16 onto an information recording layer (not shown) of the optical disc. The object lens 17 may be mounted on an object lens actuator 40 (referencing FIG. 1) arranged on the pickup base 10. The object lens actuator 40 is a device that can move the object lens 17 in the focusing direction (the direction that is perpendicular to the plane of the paper in FIG. 2) and tracking direction (the vertical direction in FIG. 2).

In the optical pickup 1, when reading or writing information focusing control may be performed so that the focal point position of the object lens 17 is on an information recording layer of the optical disc. Moreover, when reading or writing information, in the optical pickup 1 tracking control may be performed so that the position of the light spot focused onto the information recording layer of the optical disc by the object lens 17 will always follow in a track of the optical disc. The object lens actuator 40 may be used in performing, for example, this focusing control and tracking control.

The object lens actuator 40 may have a lens holder 41 for holding the object lens 17, and may be structured so as to support the lens holder 41 so as to be rotatable on a wire 42. Moreover, it moves the lens holder 41 (that is, moves the object lens 17) by a force produced using a coil and a magnet. This type of object lens actuator is well-known, so detailed explanations thereof will be omitted here. The object lens actuator may be of a different type (for example, a shaft sliding type) instead.

A sensor lens 18, provided in the optical pickup 1, produces astigmatism in the return beam from the optical disc, and the return beam is focused on a detecting surface of an light detector 19. Providing the sensor lens 18 with a function for producing astigmatism may produce the focus error (FE) signal through the astigmatism method. However, the FE signal may be produced through a method other than the astigmatism method, and the sensor lens 18 need not have a function for producing astigmatism. The return beam incident into the sensor lens 18 is a beam that, after passing through the object lens 17, is reflected from the standing mirror 16 and then passes sequentially through the collimating lens 15, the quarter wave plate 14, and the polarized beam splitter 13.

The light detector 19 provided in the optical pickup 1 may function as a photoelectric converting means for converting a received optical signal into an electric signal. The electric signal outputted from the light detector 19 is sent to a signal processing portion 20. In the signal processing portion 20, a playback signal, an FE signal, and a TE signal, and the like, are produced. A controlling portion 21 performs control procedures, such as for the lens driving device 30 and the object lens actuator 40, based on the signals obtained from the signal processing portion 20.

As described above, the optical pickup 1 may be provided with a lens driving device 30 able to move the collimating lens 15 in the direction of the optical axis. The ability to move the collimating lens 15 in the direction of the optical axis is to adjust the amount of convergence or divergence of the beam that is incident into the object lens 17, so as to control appropriately the effect of spherical aberration. For example, a BD has a plurality of information recording layers, in the thickness direction. Different information recording layers that are subject to reading of information, or the like, produce differing amounts of spherical aberration, due to the difference in the thickness of the covering layers. Moreover, when using a BD, in particular, if the object lens 17 is made out of plastic, the variations in the amount of spherical aberration produced through changes in temperature cannot be ignored. For reasons such as this, when the optical pickup 1 is applied to a BD, for example, means for correcting for the spherical aberration are required. That is, the lens driving device 30 is implemented in the optical pickup 1 as a spherical aberration correcting mechanism.

Figure 3:
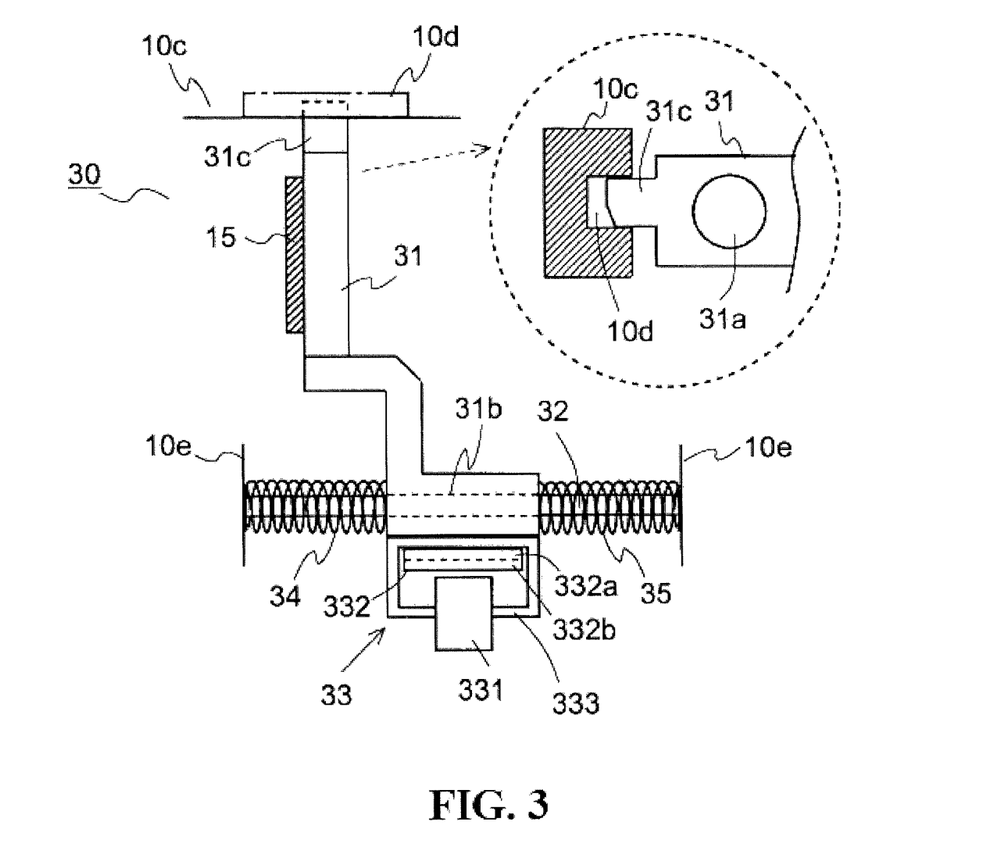
FIG. 3 is a schematic plan view diagram illustrating the structure of a lens driving device with which an optical pickup according to one or more embodiments of the present invention is equipped.
Figure 4:
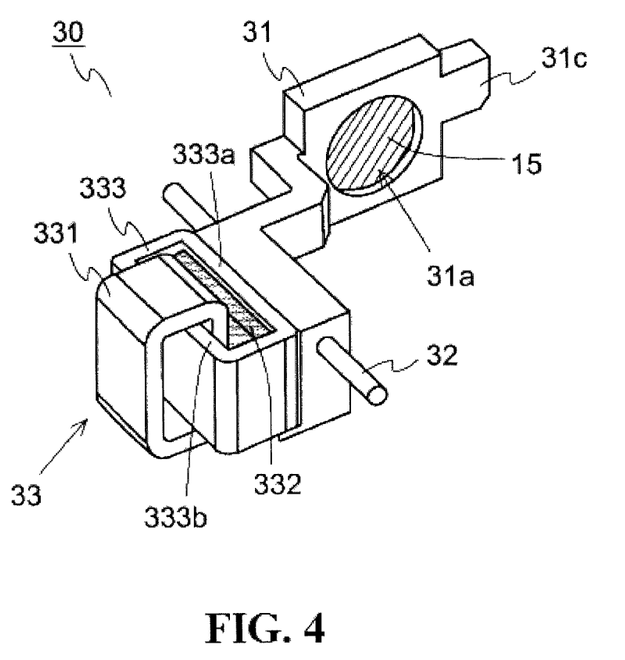
FIG. 4 is a schematic perspective diagram illustrating the structure of a lens driving device with which an optical pickup according to one or more embodiments of the present invention is equipped.

FIG. 3 is a schematic plan view diagram illustrating a structure of a lens driving device 30 provided in the optical pickup 1 according to one or more embodiments of the present invention. In FIG. 3, a portion of the structure is illustrated in cross-section, for convenience in the explanation (referencing the dotted circle). FIG. 4 is a schematic oblique view illustrating a structure for a lens driving device 30 that is provided in the optical pickup 1 according to one or more embodiments of the present invention.

The lens driving device 30 provided within the pickup base 10, as illustrated in FIG. 3 and FIG. 4, includes a lens holder 31, a guide shaft 32, a driving portion 33, a first pressing spring 34, and a second pressing displaying 35. In FIG. 4, the pressing springs 34 and 35 are omitted. The pressing springs 34 and 35 are one example of a biasing member.

The lens holder 31 can be produced through, for example, plastic molding. The shape of the lens holder 31 is determined appropriately in the design of the optical pickup 1. A holding portion 31a for holding the collimating lens 15 is provided toward one lengthwise-direction end (the vertical direction in FIG. 3) of the lens holder 31. A through hole 31b, through which the guide shaft 32 passes, is provided toward the other lengthwise-direction end of the lens holder 31. The guide shaft 32 that passes through the through hole 31b has, for example, both end portions secured to the pickup base 10.

A guide protrusion 31c may be formed at one lengthwise-direction end portion (the end portion on the side wherein the holding portion 31a is provided) of the lens holder 31. This guide protrusion 31c, as illustrated in FIG. 3, fits in a guide groove 10d provided in an inner wall 10c of the pickup base 10. The lens holder 31 may be supported movably by the guide shaft 32 and the guide groove 10d, and may be able to move in the direction parallel to the optical axis direction of the collimating lens 15 (the left-right direction in FIG. 3).

Instead of providing the guide protrusion 31c and the guide groove 10d, a guide shaft may be provided that is disposed in parallel to the guide shaft 32, passing through the lens holder 31.

The driving portion 33 may be provided with a coil 331, a magnet 332, and a yoke 333. The coil 331 is disposed secured to the pickup base 10. The coil 331 may be connected to a power supply portion (not shown) through a wire, and a voltage can be applied to the coil 331 thereby to produce an electric current. The magnet 332 and yoke 333 may be secured to the lens holder 31. That is, the magnet 332 and the yoke 333 may move together with the lens holder 31.

The yoke 333 may be structured by a combination of, for example, two magnetic pieces that are essentially L-shaped in the cross-sectional view thereof, to form a hollow structural unit that has essentially a square shape in the plan view (a cylindrical structural unit). The magnet 332 may be disposed within the yoke 333 that has the hollow structure, where one pole side 332a of the two poles thereof (the N pole or the S pole) is attached magnetically to a sidewall 333a of the yoke 333. The coil 331 secured to the pickup base 10 is wrapped so as to surround the sidewall 333b (the side while that faces the sidewall 333a) of the yoke 333. Because of this, the other pool side 332b of the magnet 332 is disposed facing the coil 331.

The coil 331, the magnet 332, and the yoke 333 may form a magnetic circuit. When an electric current is applied to the coil 331, the magnet 332 provided movably is moved by the magnetic force produced through the interaction between the electric current flowing in the coil 331 and the magnetic field that is formed by the magnet 332. That is, the lens holder 31, wherein the magnet 332 is secured, is moved through the electric current flowing in the coil 331. By changing the direction of the electric current that flows in the coil 331 the direction of movement of the lens holder 31 is reversed. Moreover, the magnitude of the magnetic force that is produce varies with the magnitude of the electric current that flows in the coil 331, so the amount of movement of the lens holder 31 varies as well.

The first pressing spring 34 and the second pressing spring 35, both structured from compression springs, may be disposed with the lens holder 31 interposed therebetween, and loosely fitted into the guide shaft 32. The end portions of the two pressing springs 34 and 35, on the sides that are opposite from the sides that contact the lens holder 31, may both contact walls 10e provided in the pickup base 10.

When there is no current flowing in the coil 331 (when no magnetic force is produced), the stopping position of the lens holder 31 may be determined based on the relationship of the biasing force applied to the lens holder 31 by the first pressing spring 34 and the biasing force applied to the lens holder 31 by the second pressing spring 35. When an electric current is applied to the coil 331, producing a magnetic force, the stopping position of the lens holder 31 may be determined by the relationship between the magnetic force and the biasing forces of the two pressing springs 34 and 35.

While in one or more embodiments two pressing springs 34 and 35 are arranged in order to apply biasing forces to the lens holder 31, this number may be varied as appropriate, and, for example, the number of pressing springs may even be 1. However, when two pressing springs are arranged to apply biasing forces to the lens holder 31 in mutually opposing directions, then, when compared to the case wherein only a single pressing spring is provided, the amount of current that flows in the coil 331 in order to move the lens holder 31 can be reduced. Moreover, the pressing springs 34 and 35 may be replaced with another spring member, such as, for example, a tensile spring. Moreover, a biasing force may be applied to the lens holder 31 using another biasing member, such as a rubber member, instead of the pressing springs 34 and 35.

In the lens driving device 30 according to one or more embodiments, the through hole 31b through which the guide shaft 32 passes (provided in the lens holder 31) is of a size that is near to the diameter of the guide shaft 32, for the purpose of preventing the occurrence of play, or the like. Because of this, because the effects of the static frictional force that acts between the lens holder 31 and the guide shaft 32, in some cases the lens holder 31 will not move when an attempt is made to move the lens holder 31 by simply applying the target DC voltage to the coil 331. Moreover, even if the lens holder 31 is moved through the application of the DC voltage to the coil 331, in some cases the result of the occurrence of stickslip or hysteresis, as the effect of the static frictional force, is the inability to stop the lens holder 31 accurately at the target position.

Figure 5:
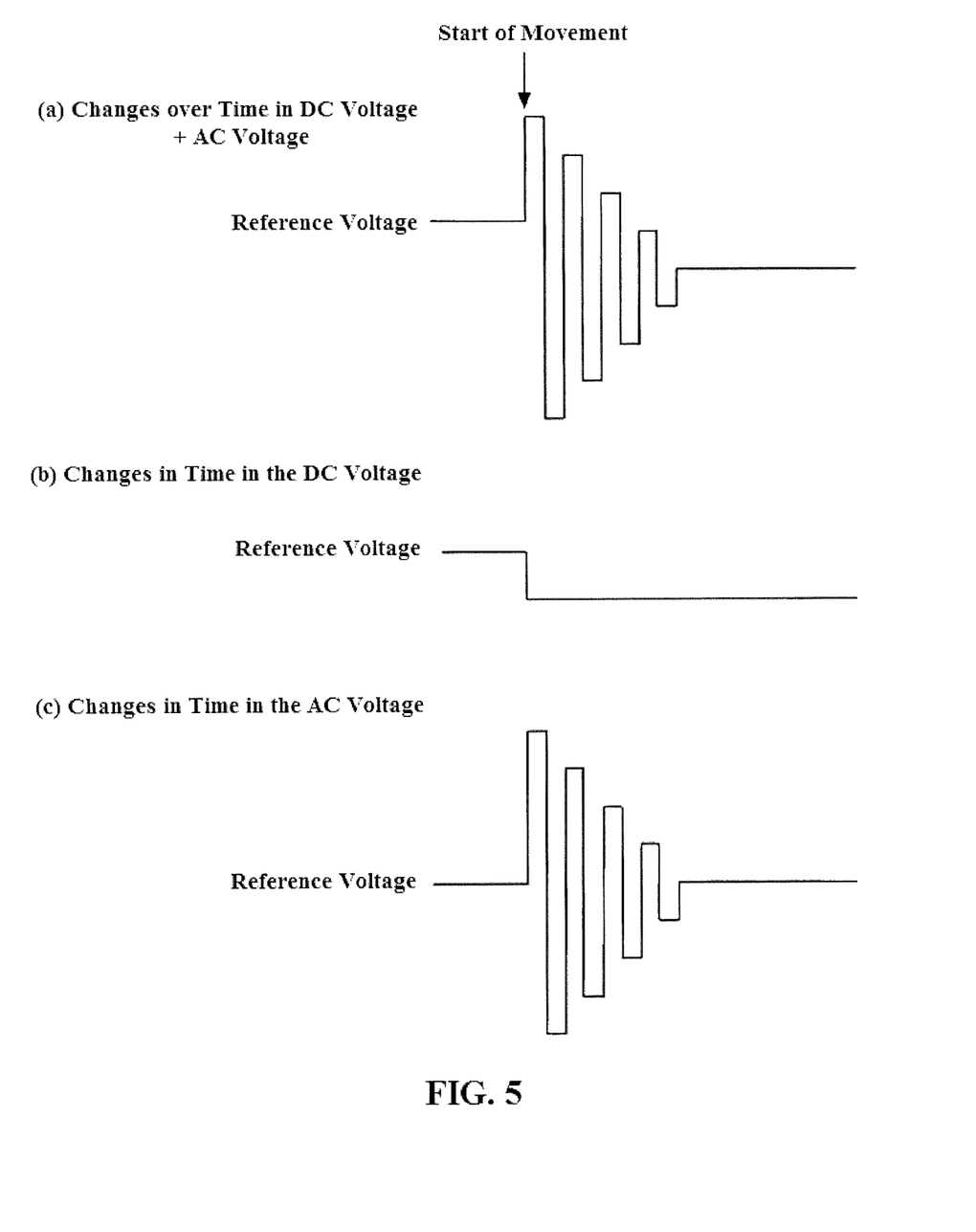
FIG. 5 is a schematic diagram for explaining one example of a driving pattern of a lens driving device according to the present embodiment.

FIG. 5 is a schematic diagram for explaining one example of a driving pattern for the lens driving device 30 according to one or more embodiments of the present invention. In the example illustrated in FIG. 5, when moving the lens holder 31 (and the collimating lens 15) to the target position, a voltage wherein an AC voltage is superimposed on a DC voltage (that is, DC voltage+AC voltage) is applied to the coil 331 (referencing FIG. 5 (a)).

FIGS. 5 (b) and (c) show the DC component (the DC voltage) and the AC component (the AC voltage) in (a) separately. Furthermore, the reference voltage in FIG. 5 shows the voltage that is applied to the coil 331 prior to the start of movement, and may or may not be zero fault. This point is true for FIG. 6 and FIG. 7, described below, as well.

In the example illustrated in FIG. 5, the DC component is controlled to a constant value from the start of movement of the lens holder 31 (referencing FIG. 5 (b)). This constant voltage is the voltage value (the DC voltage value) required to move the lens holder 31 to the target position. The determination of this voltage value is performed by, for example, the controlling portion 21.

Moreover, in the example illustrated in FIG. 5, the AC component is superimposed on the DC component for a specific time interval after the beginning of movement of the lens holder 31 (referencing FIG. 5 (c)). That is, after the specific time interval has elapsed after the beginning of motion, only the DC voltage will be applied to the coil 331. The amplitude of the AC component, at the time of the start of movement, has a value that is larger than the absolute value of the voltage value for the DC component. Furthermore, the amplitude is reduced in a stepwise manner with the passage of time. While the AC component in the example illustrated in FIG. 5 is a square wave, this does not imply that there is any limitation thereto. For example, it may be a different AC waveform, such as a sine wave, or the like.

Figure 6:
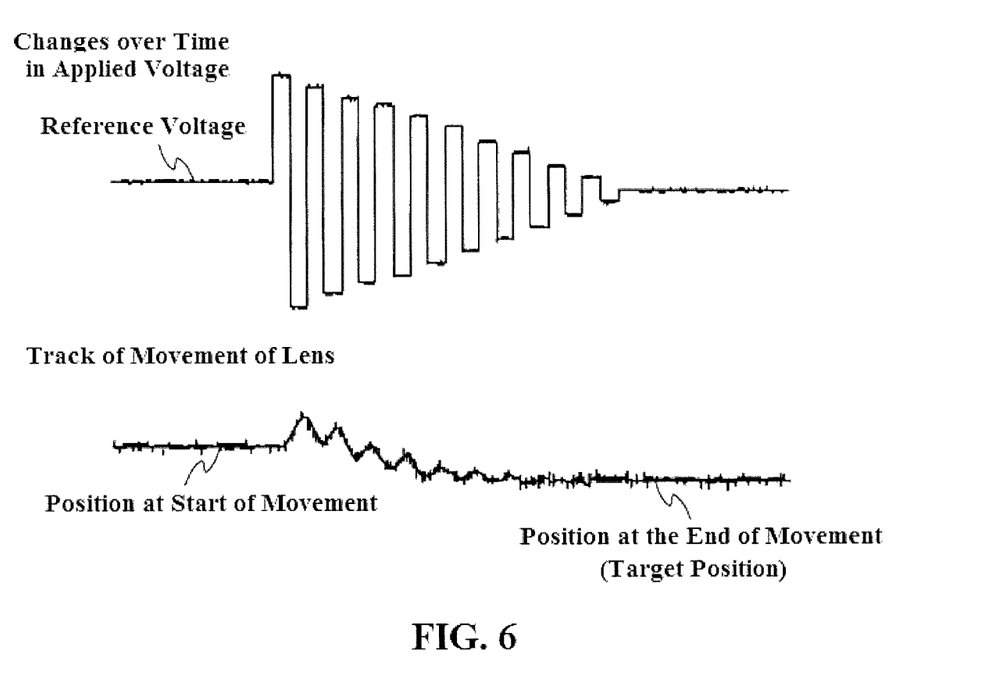
FIG. 6 is a diagram illustrating one example of a lens movement track in a case wherein a lens is moved to a target position using a lens driving device according to the present embodiment.

FIG. 6 is a diagram illustrating one example of the movement track of the lens 15 in the case of moving the lens 15 to a target position using the lens driving device 30 according to one or more embodiments of the present invention. In the example illustrated in FIG. 6, the DC component is a constant value from the beginning of movement of the collimating lens 15, in the same manner as in FIG. 5, described above. This constant value is the voltage value (the DC voltage value) required for moving the lens holder 31 to the target position, and is between about several hundred mV and 1 V. The amplitude of the AC component, at the time of the start of movement, is set so as to be larger than the voltage value of the DC component, and is, for example, several volts. Moreover, the AC component is applied for several tens of mS, with a frequency in the order of several hundred Hz. Presenting a more specific example, an AC waveform is applied at a frequency of 200 Hz for an interval of 50 ms, for a total of 10 cycles worth. Moreover, the amplitude of the AC component is reduced in a stepwise manner with, for example, each single cycle (or half cycle, or the like) to the order of several hundred mV, or the like.

The values of the individual parameters presented here will change depending on the design of the lens driving device 30, and, of course, are no more than illustrative examples. Moreover, when it comes to the period of the AC voltage, this point requires caution because the targeted effects cannot be obtained if it is too long or too short.

As illustrated in FIG. 6, because an AC component having a large amplitude is applied at the time of the beginning of movement, a large magnetic force acts on the lens holder 31, so the lens holder 31 (and the collimating lens 15) begins to move smoothly. In the example illustrated in FIG. 6, at the beginning of movement, a DC voltage is applied so as to move in the opposite direction from the target direction, and thus the lens holder 31 begins to move in the direction opposite from the target position. Given this, the effect of reducing the amplitude of the AC component in a stepwise manner, and the effect of the DC component, may cause the position of the lens holder 31 (and the collimating lens 15) to converge on the target position as the interval over which the AC component is applied nears its end. After the lens holder 31 has arrived at the target position, the DC voltage is applied alone, holding the lens holder 31 in the target position.

In the example illustrated in FIG. 6, the effect of the large-amplitude AC component at the time of the beginning of movement of the collimating lens 15 prevents the effects of the static frictional force, enabling the lens holder 31 to move smoothly. Moreover, in the step wherein the lens holder 31 has neared the target location, the AC component has a small amplitude, thus making it possible to stop the lens holder 31 at the target position accurately.

While in the example illustrated in FIG. 6 an AC voltage was applied so as to move the lens holder 31 in the direction opposite from the direction of the target at the start of movement, the present invention is not limited to this structure. That is, instead an AC voltage may be applied so as to move the lens holder 31 in the direction of the target at the beginning of movement. Moreover, the various parameters of the AC component (the size of the amplitude, the frequency, the period over which it is applied, etc.) may be changed depending on differences in the amount of movement of the collimating lens 15, or may be maintained at constant values. These may be determined as appropriate through testing or simulations, or the like, performed in the design stage, or the like, of the optical pickup 1.

Figure 7:
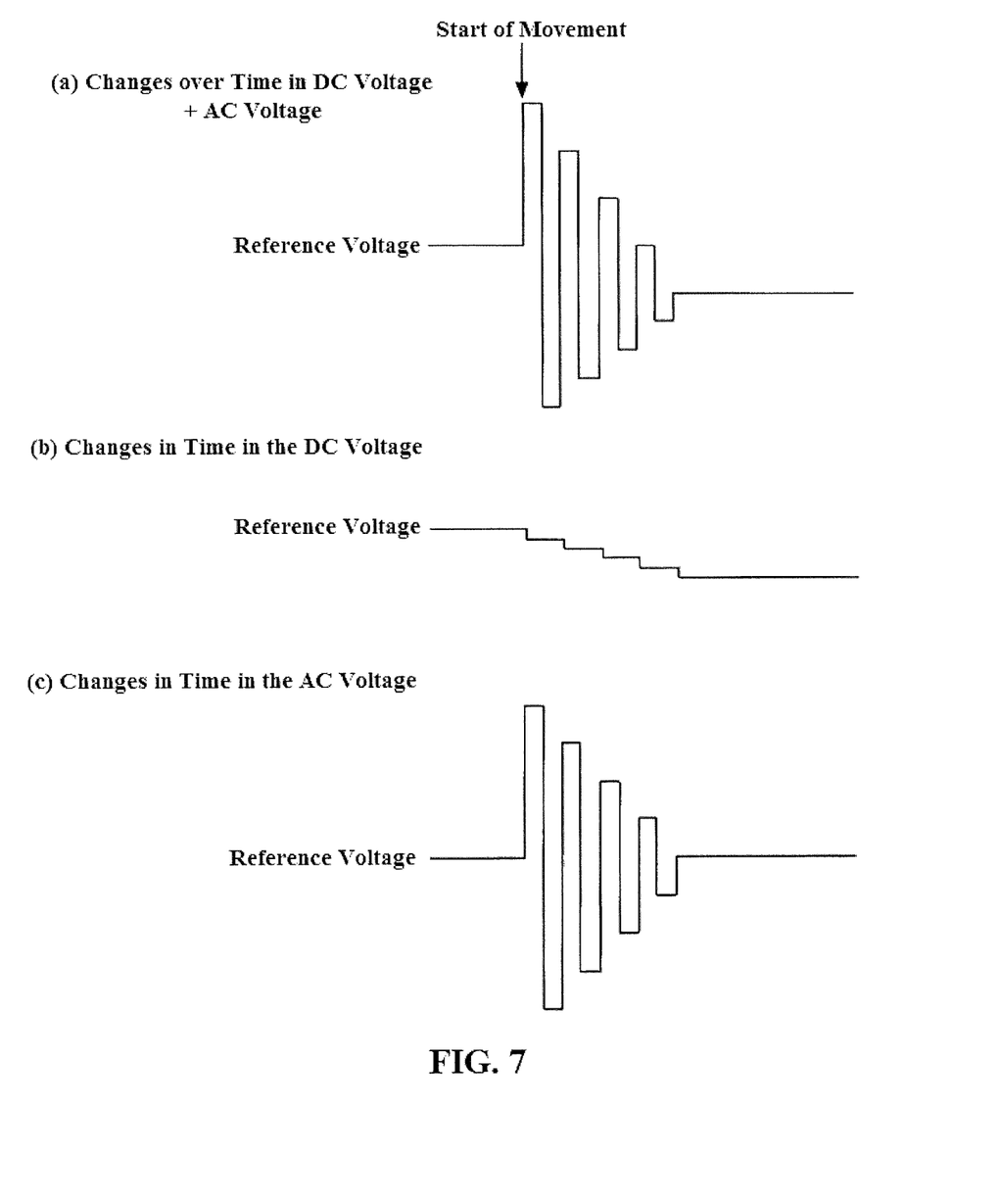
FIG. 7 is a schematic diagram for explaining another example of a driving pattern for a lens driving device according to the present embodiment.

Another control pattern for the lens driving device 30 will be explained in reference to FIG. 7. In this case as well, the lens holder 31 (and the collimating lens 15) may be stopped accurately at the target position, without being affected by the static frictional force. FIG. 7 is a schematic diagram for explaining another example of a driving pattern of the lens driving device 30 according to one or more embodiments of the present invention. In the example illustrated in FIG. 7 as well, when moving the lens holder 31 to the target position, a voltage wherein an AC voltage is superimposed on a DC voltage (that is, DC voltage+AC voltage) is applied to the coil 331 (referencing FIG. 7 (a)).

FIGS. 7 (b) and (c) show the DC component (the DC voltage) and the AC component (the AC voltage) in (a) separately.

In the example illustrated in FIG. 7, the DC component is controlled so that the absolute value thereof increases stepwise from the beginning of movement of the lens holder 31 (referencing FIG. 7 (b)). The DC component ultimately goes to the voltage value (the DC voltage value) required for moving the lens holder 31 to the target position. The DC component need only ultimately go to the voltage value that is required for moving the lens holder 31 to the target position, and the way in which it is changed may be varied as appropriate.

The AC component in the example illustrated in FIG. 7 is the same pattern as for the case of FIG. 5. However, in the same way as explained in the part for FIG. 5 and FIG. 6, the various parameters when applying the AC component can be varied as appropriate.

In the example illustrated in FIG. 7, because a large AC voltage is applied at the time of the beginning of movement, a large magnetic force acts on the lens holder 31, so the lens holder 31 (and the collimating lens 15) can begin to move smoothly. Given this, the effect of reducing the amplitude of the AC component in a stepwise manner, and the effect of the DC component nearing the target in a stepwise manner, may cause the position of the lens holder 31 to converge on the target position as the interval over which the AC component is applied nears its end. After the lens holder 31 has arrived at the target position, the DC voltage is applied alone, holding the lens holder 31 in the target position.

In the example illustrated in FIG. 7 as well, the effect of the large-amplitude AC component at the time of the beginning of movement of the collimating lens 15 prevents the effects of the static frictional force, enabling the lens holder 31 to move smoothly. Moreover, in the step wherein the collimating lens 15 has neared the target location, the AC component has a small amplitude, thus making it possible to stop the collimating 15 at the target position accurately.

The embodiments set forth above are illustrative examples of the present invention, and the scope of application of the present invention is not limited to the structures of the embodiments described above.

For example, the lens driving device 30 in the embodiments set forth above used a structure wherein the coil 331 was stationary and the magnet 332 moved (a so-called "moving magnet"). However, the scope of application of the present invention is not limited thereto. That is, the present invention can also be applied to a lens driving device of a structure wherein the magnet is stationary and the coil moves (a so-called "moving coil").

Moreover, in the embodiments set forth above, the lens driving device 30 was a structure for moving the collimating lens 15. However, the lens that is driven by the lens driving device 30 may instead be another lens (such as, for example, a movable lens for structuring an expander lens), rather than a collimating lens.

Furthermore, the lens driving device according to the present invention may also be applied to optical systems other than optical pickups (such as cameras, and the like).

While the invention has been described with respect to a limited number of embodiments, those skilled in the art, having benefit of this disclosure, will appreciate that other embodiments can be devised which do not depart from the scope of the invention as disclosed herein. Furthermore, those of ordinary skill in the art would appreciate that certain components or "portions" of one or more embodiments of the present invention may be implemented by a circuit, processor, etc. using known methods. Accordingly, the scope of the invention should be limited only by the attached claims.

EXPLANATION OF CODES

1: Optical Pickup
11: Semiconductor Laser (Light Source)
15: Collimating Lens
17: Object Lens
30: Lens Driving Device
31: Lens Holder
32: Guide Shaft
33: Driving Portion
34: First Pressing Spring (Biasing Member)
35: Second Pressing Spring (Biasing Member)
331: Coil
332: Magnet

What is claimed is:

1. A lens driving device comprising:
a lens holder that holds a lens; and
a driving portion comprising a coil and a magnet and that drives the lens holder through a magnetic force produced using the coil and the magnet,
wherein the coil receives a DC voltage that causes the lens holder to move to a target position,
wherein the coil receives an AC voltage over a specific interval from a beginning of movement of the lens holder, the AC voltage being superimposed on the DC voltage,
wherein an amplitude of the AC voltage is reduced stepwise over passage of time,
wherein, at the beginning of movement of the lens holder, the coil receives a first AC voltage that is the highest voltage applied to the coil throughout the specific interval,
wherein, when the lens holder arrives at a point within a certain distance from the target position or a certain time passes from the beginning of movement of the lens holder, the coil receives a second AC voltage that is lower than the first AC voltage, and
wherein an amplitude of the first AC voltage is larger than an absolute value of the DC voltage applied to the coil at the beginning of movement of the lens holder.

2. The lens driving device as set forth in claim 1, wherein the DC voltage is maintained at a constant value from the beginning of movement of the lens holder, and
the constant value is the same as a voltage value required for moving the lens holder to the target position.

3. The lens driving device as set forth in claim 2, further comprising:

a biasing member that biases the lens holder, wherein
a stopping position of the lens holder is determined based on a relationship between the magnetic force and a biasing force of the biasing member.

4. The lens driving device as set forth in claim 1, wherein a value of the DC voltage is changed stepwise to become a voltage value required for moving the lens holder to the target position at a point in time at which a specific interval has elapsed.

5. The lens driving device as set forth in claim 4, further comprising:
a biasing member that biases the lens holder, wherein
a stopping position of the lens holder is determined based on a relationship between the magnetic force and a biasing force of the biasing member.

6. The lens driving device as set forth in claim 1, further comprising:
a biasing member that biases the lens holder, wherein
a stopping position of the lens holder is determined based on a relationship between the magnetic force and a biasing force of the biasing member.

7. An optical pickup comprising the lens driving device as set forth in claim 1.

8. The optical pickup as set forth in claim 7, further comprising:
a light source; and
an object lens that focuses light emitted from the light source onto an information recording layer of an optical disk, wherein
the lens of the lens driving device is a collimating lens disposed on a light path between the light source and the object lens.

9. The optical pickup as set forth in claim 7, further comprising a controlling portion that controls the lens driving device.

10. The lens driving device as set forth in claim 1, further comprising:
a biasing member that biases the lens holder, wherein
a stopping position of the lens holder is determined based on a relationship between the magnetic force and a biasing force of the biasing member.

11. The lens driving device as set forth in claim 1,
wherein the amplitude of the AC voltage applied to the coil is reduced until the lens holder arrives at the target position and is not applied afterward so as to maintain the lens holder at the target position.

12. A method for driving a lens, comprising:
driving a lens holder that holds a lens through a magnetic force produced using a coil and a magnet;
moving the lens holder to a target position;
applying a DC voltage to the coil;
applying an AC voltage to the coil over a specific interval from a beginning of movement of the lens holder; and
reducing an amplitude of the AC voltage stepwise over passage of time,
wherein the applying of the AC voltage comprises:
applying, at the beginning of movement of the lens holder, a first AC voltage to the coil that is the highest voltage applied to the coil throughout the specific interval; and
applying, when the lens holder arrives at a point within a certain distance from the target position or a certain time passes from the beginning of movement of the lens holder, a second AC voltage that is lower than the first AC voltage to the coil, and
wherein an amplitude of the first AC voltage is larger than an absolute value of the DC voltage applied to the coil at the beginning of movement of the lens holder.

13. The method as set forth in claim 12, further comprising:
superimposing the AC voltage on the DC voltage applied to the coil to move the lens holder.

14. The method as set forth in claim 13, further comprising:
maintaining the DC voltage at a constant value from the beginning of movement of the lens holder, wherein
the constant value is the same as a voltage value required for moving the lens holder to the target position.

15. The method as set forth in claim 13, further comprising:
changing a value of the DC voltage stepwise to become a voltage value required for moving the lens holder to the target position at a point in time at which a specific interval has elapsed.

16. The method as set forth in claim 13, further comprising:
biasing the lens holder; and
determining a stopping position of the lens holder based on a relationship between the magnetic force and a biasing force of the biasing member.

17. The method as set forth in claim 13, wherein the amplitude of the first AC voltage is larger than an absolute value of the DC voltage applied to the coil at the beginning of movement of the lens holder.

18. The method as set forth in claim 13,
wherein the amplitude of the AC voltage applied to the coil is reduced until the lens holder arrives at the target position and is not applied afterward so as to maintain the lens holder at the target position.

* * * * *